United States Patent
Schuster et al.

(10) Patent No.: US 6,741,586 B1
(45) Date of Patent: May 25, 2004

(54) SYSTEM AND METHOD FOR SHARING COMPUTER SCREENS OVER A TELEPHONY NETWORK

(75) Inventors: Guido M. Schuster, Des Plaines, IL (US); Ikhlaq S. Sidhu, Vernon Hills, IL (US); Jerry J. Mahler, Prospect Heights, IL (US); Frederick D. Dean, Chicago, IL (US); Jacek A. Grabiec, Chicago, IL (US)

(73) Assignee: 3Com Corporation, Marlborough, MA (US)

( * ) Notice: Subject to any disclaimer, the term of this patent is extended or adjusted under 35 U.S.C. 154(b) by 839 days.

(21) Appl. No.: 09/584,927

(22) Filed: May 31, 2000

(51) Int. Cl.[7] .......................... H01L 12/66; H04M 1/64
(52) U.S. Cl. .................. 370/352; 370/493; 379/88.17; 379/900
(58) Field of Search ................................ 370/351–356, 370/493–495, 259–271, 400–401; 379/265.01–265.09, 900, 88.17; 725/106, 110; 709/204

(56) References Cited

U.S. PATENT DOCUMENTS

| | | |
|---|---|---|
| 4,313,035 A | 1/1982 | Jordan et al. |
| 4,953,198 A | 8/1990 | Daly et al. ..................... 379/61 |
| 4,973,837 A | 11/1990 | Bradbeer |
| 5,428,663 A | 6/1995 | Grimes et al. |
| 5,448,623 A | 9/1995 | Wiedeman et al. |
| 5,471,616 A | 11/1995 | Johnson et al. |
| 5,497,339 A | 3/1996 | Bernard ................. 364/705.05 |
| 5,557,658 A | 9/1996 | Gregorek et al. ............. 379/67 |
| 5,563,937 A | 10/1996 | Bruno et al. |
| 5,606,594 A | 2/1997 | Register et al. ............... 379/58 |
| 5,646,945 A | 7/1997 | Gergler |
| 5,727,057 A | 3/1998 | Emery et al. ................ 379/211 |
| 5,742,905 A | 4/1998 | Pepe et al. .................. 455/461 |
| 5,838,665 A | 11/1998 | Kahn et al. ................. 370/260 |

(List continued on next page.)

FOREIGN PATENT DOCUMENTS

| | | |
|---|---|---|
| DE | 198 13 179 A 1 | 9/1999 |
| EP | 0 578 374 A1 | 6/1993 |

(List continued on next page.)

OTHER PUBLICATIONS

"Understanding Packet Voice Protocols"; The International Engineering Consortium; http://www.iec.org.
Terry, Douglas B. et al. *Managing Stored Voice In the Etherphone System*, Operating Systems Review (SIGOPS), US, ACM Head Quarter, New York, NY. vol. 21, No. % (Nov. 8, 1987), pps. 103–104, XP 000005196.
Zellweger, Polle T. et al. *An Overview of the Etherphone System and Its Applications*, Xerox Palo Alto Research Center (Mar. 1988), pps. 160–168, XP 000617541.
Terry, Douglas B. et al. *Managing Stored Voice In the Etherphone System*, Xerox Palo Alto Research Center vol. 1, (Feb. 1988), pps. 3–27, XP 000032477.

(List continued on next page.)

Primary Examiner—Steven H. D Nguyen
(74) Attorney, Agent, or Firm—McDonnell Boehnen Hulbert & Berghoff LLP

(57) ABSTRACT

A system and method for communicating screen display images on a computer to another computer using a telephony network. A screen share button on a data network telephone initiates a screen shot request to a first computer associated with the data network telephone. The first computer uses a screen shot application to retrieve the image on the computer display and send it to the data network telephone. The data network telephone receives the screen shot image and sends the image to another data network telephone which is a party to a telephone conversation with the first data network telephone. The first data network telephone preferably uses the SIP invite with a session description protocol that permits the transfer of image data on SIP messages. The second data network telephone implements the image data session description protocol and communicates the screen shot image to the second computer.

1 Claim, 7 Drawing Sheets

U.S. PATENT DOCUMENTS

| | | | |
|---|---|---|---|
| 5,841,977 A | * 11/1998 | Ishizaki et al. | 370/261 |
| 5,850,433 A | 12/1998 | Rondeau | 379/201 |
| 5,884,032 A | * 3/1999 | Bateman et al. | 370/356 |
| 5,894,473 A | 4/1999 | Dent | |
| 5,894,595 A | 4/1999 | Foladare et al. | 455/414 |
| 5,915,008 A | 6/1999 | Dulman | 379/201 |
| 5,918,172 A | 6/1999 | Saunders et al. | 455/404 |
| 5,930,700 A | 7/1999 | Pepper et al. | |
| 5,933,778 A | 8/1999 | Buhrmann et al. | 455/461 |
| 5,938,757 A | 8/1999 | Bertsch | |
| 5,960,340 A | 9/1999 | Fuentes | |
| 5,970,059 A | 10/1999 | Ahopelto et al. | |
| 6,006,272 A | 12/1999 | Aravamudan et al. | |
| 6,046,762 A | * 4/2000 | Sonesh et al. | 379/265.01 |
| 6,075,992 A | 6/2000 | Moon et al. | |
| 6,084,584 A | 7/2000 | Nahi et al. | |
| 6,141,341 A | 10/2000 | Jones et al. | |
| 6,167,040 A | 12/2000 | Haeggstrom | |
| 6,175,860 B1 | 1/2001 | Gaucher | |
| 6,188,688 B1 | 2/2001 | Buskirk, Jr. | |
| 6,212,261 B1 | 4/2001 | Meubus et al. | |
| 6,216,158 B1 | 4/2001 | Luo et al. | |
| 6,240,097 B1 | 5/2001 | Weslock et al. | |
| 6,334,126 B1 | 12/2001 | Nagatomo et al. | |
| 6,337,858 B1 | 1/2002 | Petty et al. | |
| 6,359,892 B1 | 3/2002 | Szlam et al. | |
| 6,385,308 B1 | 5/2002 | Cohen et al. | |
| 6,404,764 B1 | 6/2002 | Jones et al. | |
| 6,411,965 B2 | 6/2002 | Klug | |
| 6,414,962 B1 | 7/2002 | Hall et al. | |
| 6,418,198 B2 | 7/2002 | Brablec et al. | |
| 6,425,131 B2 | * 7/2002 | Crandall et al. | 725/106 |
| 6,445,697 B1 | 9/2002 | Fenton | |
| 6,448,978 B1 | 9/2002 | Salvador et al. | |
| 6,456,594 B1 | 9/2002 | Kaplan et al. | |
| 6,456,601 B1 | 9/2002 | Kozdon et al. | |
| 6,477,565 B1 | 11/2002 | Daswani et al. | |
| 6,477,576 B2 | 11/2002 | Angwin et al. | |
| 6,483,902 B1 | 11/2002 | Stewart et al. | |
| 6,493,338 B1 | 12/2002 | Preston et al. | |
| 6,496,477 B1 | 12/2002 | Perkins et al. | |
| 6,526,462 B1 | 2/2003 | Elabd | |
| 6,539,359 B1 | 3/2003 | Ladd et al. | |
| 2001/0022784 A1 | 9/2001 | Menon et al. | |
| 2001/0030950 A1 | 10/2001 | Chen et al. | |

FOREIGN PATENT DOCUMENTS

| | | |
|---|---|---|
| EP | 0 704 788 A2 | 4/1996 |
| EP | 0 869 688 A2 | 10/1998 |
| EP | 0 881 848 A2 | 12/1998 |
| WO | WO95/34985 | 12/1995 |
| WO | WO 97/31492 | 8/1997 |
| WO | WO 97/33421 | 9/1997 |
| WO | WO98/00988 | 1/1998 |
| WO | WO 98/04065 | 1/1998 |
| WO | WO98/10538 | 3/1998 |
| WO | WO 98/16051 | 4/1998 |
| WO | WO98/21911 | 5/1998 |
| WO | WO 98/30008 | 7/1998 |
| WO | WO 98/37665 | 8/1998 |
| WO | WO 99/12365 | 3/1999 |
| WO | WO 99/19988 | 4/1999 |

OTHER PUBLICATIONS

Hansson, Allan et al., *Phone Doubler—A Step Towards Integrated Internet and Telephone Communications*, Ericsson Review, No. 4, 1997, pps. 142–152.

U.S. patent application Ser. No. 09/451,388, Schuster et al., filed Nov. 30, 1999.

U.S. patent application Ser. No. 09/406,231, Schuster et al., filed Sep. 27, 1999.

U.S. patent application Ser. No. 09/515,365, Schuster et al., filed Feb. 29, 2000.

U.S. patent application Ser. No. 09/406,320, Schuster et al., filed Sep. 27, 1999.

U.S. patent application Ser. No. 09/515,797, Schuster et al., filed Feb. 29, 2000.

U.S. patent application Ser. No. 09/515,364, Schuster et al., filed Feb. 29, 2000.

U.S. patent application Ser. No. 09/405,283, Schuster et al., filed Sep. 27, 1999.

U.S. patent application Ser. No. 09/515,798, Schuster et al., filed Feb. 29, 2000.

U.S. patent application Ser. No. 09/584,924, Schuster et al., filed May 31, 2000.

U.S. patent application Ser. No. 09/515,969, Schuster et al., filed Feb. 29, 2000.

U.S. patent application Ser. No. 09/406,322, Schuster et al., filed Sep. 27, 1999.

U.S. patent application Ser. No. 09/406,152, Schuster et al., filed Sep. 27, 1999.

U.S. patent application Ser. No. 09/405,981, Schuster et al., filed Sep. 27, 1999.

U.S. patent application Ser. No. 09/406,128, Schuster et al., filed Sep. 27, 1999.

U.S. patent application Ser. No. 09/515,387, Schuster et al., filed Feb. 29, 2000.

U.S. patent application Ser. No. 09/515,970, Schuster et al., filed Feb. 29, 2000.

U.S. patent application Ser. No. 09/515,796, Schuster et al., filed Feb. 29, 2000.

U.S. patent application Ser. No. 09/406,151, Schuster et al., filed Sep. 27, 1999.

U.S. patent application Ser. No. 09/406,298, Schuster et al., filed Sep. 27, 1999.

U.S. patent application Ser. No. 09/406,066, Schuster et al., filed Sep. 27, 1999.

U.S. patent application Ser. No. 09/515,795, Schuster et al., filed Feb. 29, 2000.

U.S. patent application Ser. No. 09/516,269, Schuster et al., filed Feb. 29, 2000.

U.S. patent application Ser. No. 09/515,366, Schuster et al., filed Feb. 29, 2000.

U.S. patent application Ser. No. 09/470,879, Schuster et al., filed Dec. 22, 1999.

U.S. patent application Ser. No. 09/707,708, Schuster et al., filed Nov. 7, 2000.

U.S. patent application Ser. No. 09/677,077, Schuster et al., filed Sep. 29, 2000.

U.S. patent application Ser. No. 09/726,993, Schuster et al., filed Nov. 30, 2000.

U.S. patent application Ser. No. 09/728,833, Schuster et al., filed Nov. 30, 2000.

International Search Report for PCT Application Serial No. PCT/US00/26618, Dated Feb. 19, 2001.

Pepper, David J. et al., *The Call Manager System: A Platform for Intelligent Telecommunications Services*, Speech Communication, vol. 23, (1997), pps. 129–139.

Dalgic, Ismail et al., *True Number Portability and Advanced Call Screening in a SIP–Based IP Telephony System*, IEEE Communications Magazine, vol. 37, No. 7, (Jul. 1999), pps. 96–101.

International Search Report for PCT Application Serial No. PCT/US00/26094, Dated Jan. 31, 2001.

International Search Report for PCT Application Serial No. PCT/US00/26594, Dated Feb. 6, 2001.

Watanabe, H. et al., *Development of the BTRON–BrainPad*, Proceedings 13th Tron Project International Symposium, Online!, (Dec. 4–7, 1996), pps. 95–103.

Gessler, Stefan et al., *PDAs as Mobile WWW Browsers*, Computer Networks and ISDM Systems, vol. 28, No. 1, (Dec. 1995), pps. 53–59.

International Search Report for PCT Application Serial No. PCT/US00/26650, Dated Feb. 19, 2001.

International Search Report for PCT Application Serial No. PCT/US00/41020, Dated Feb. 21, 2001.

Anquetil, L.P. et al., *Media Gateway Control Protocol and Voice Over IP Gateways. MGCP and VoIP Gateways Will Offer Seamless Interworking of New VoIP Networks with Today's Telephone Networks*, Electrical Communication, (Apr. 1, 1999), pps. 151–157.

International Search Report for PCT Application Serial No. PCT/US00/26649, Dated Feb. 6, 2001.

3COM SIP Solutions 1.0 benefits brochure. (4 total pages).

Sidhu, Ikhlaq and Bezaitis, Andrew, Eat or be eaten, www.americasnetwork.com/issues/99issues/991101/991191_eat.htm, printed May 10, 2000, (6 total pages).

Myers, Brad A.; Stiel, Herb; and Gargiulo, Robert, Collaboration Using Multiple PDAs Connected to a PC, Proceedings of the ACM 1998 conference on Computer supported cooperative work, Nov. 14–18, 1998, Seattle, WA, (total 11 pages).

Dalgic, Ismail; Borella, Michael; Dean, Rick; Grabiec, Jacek; Mahler, Jerry; Schuster, Guido; and Sidhu, Ikhlaq, True Number Portability and Advanced Call Screening in a SIP–Based IP Telephony System, *IEEE Communications Magazine*, vol. 37, No. 7, Jul. 1999, pp. 96–101. (8 total pages).

Handley/Schulzrinne/Schooler/Rosenberg, SIP: Session Initiation Protocol, Network Working Group, Request for Comments (RFC) 2543, Mar. 1999, (153 pages).

Handley/Schulzmann/Schooler/Rosenberg, SIP: Session Initiation Protocol, Internet Engineering Task Force, draft–ietf–sip–rfc2543bis–02.ps. Sep. 4, 2000. (131 pages).

* cited by examiner

SYSTEM AND METHOD FOR SHARING COMPUTER SCREENS OVER A TELEPHONY NETWORK

BACKGROUND OF THE INVENTION

A. Field of the Invention

The present invention is related to a method and system for providing communication services over a network. In particular, the present invention relates to a system and method for communicating images over a telephony network.

B. Description of the Related Art

For many years, telephone service providers on the Public Switched Telephone Network (PSTN) provided their customers nothing more than a telephone line to use to communicate with other subscribers. Over time, telephone service providers have enhanced their service by providing Custom Local Area Signaling Service (CLASS) features to their customers. Similar communication services are provided by a Private Branch Exchange (PBX), which is typically implemented in a nonresidential setting.

The CLASS features permit customer subscribers of the features to tailor their telephone service according to individual needs. Some of the more popular CLASS features are:

Call blocking: The customer may specify one or more numbers from which he or she does not want to receive calls. A blocked caller will hear a rejection message, while the callee will not receive any indication of the call.

Call return: Returns a call to the most recent caller. If the most recent caller is busy, the returned call may be queued until it can be completed.

Call trace: Allows a customer to trigger a trace of the number of the most recent caller.

Caller ID: The caller's number is automatically displayed during the silence period after the first ring. This feature requires the customer's line to be equipped with a device to read and display the out-of-band signal containing the number.

Caller ID blocking: Allows a caller to block the display of their number in a callee's caller ID device.

Priority ringing: Allows a customer to specify a list of numbers for which, when the customer is called by one of the numbers, the customer will hear a distinctive ring.

Call forwarding: A customer may cause incoming calls to be automatically forwarded to another number for a period of time.

A customer subscriber to a CLASS feature may typically activate and/or de-activate a CLASS feature using "*" directives (e.g., *69 to automatically return a call to the most recent caller). CLASS features may also be implemented with the use of out-of-band data. CLASS feature data is typically transmitted between local Class-5 switches using the Signaling System #7 (SS7).

Local Exchange Carriers (LECs) and other similar organizations maintain CLASS offices that typically contain a database entry for each customer. The database allows specification of the CLASS features a customer has subscribed to, as well as information, such as lists of phone numbers, associated with those features. In some cases, customers may edit these lists on-line via a touch-tone interface. A list of all phone numbers that have originated or terminated a call with each customer is often included in the CLASS office database. For each customer, usually only the most recent number on this list is stored by the local Class-5 switch.

A Private Branch Exchange (PBX), is a stored program switch similar to a Class-5 switch. It is usually used within a medium-to-large-sized business for employee telephony service. Since a PBX is typically operated by a single private organization, there exists a wide variety of PBX services and features. Custom configurations are common, such as integration with intercom and voice mail systems. PBX's typically support their own versions of the CLASS features, as well as other features in addition to those of CLASS. Most PBX features are designed to facilitate business and group communications.

A summary of typical PBX features includes:

Call transfer: An established call may be transferred from one number to another number on the same PBX.

Call forwarding: In addition to CLASS call forwarding, a PBX number can be programmed to automatically transfer a call to another number when the first number does not answer or is busy.

Camp-on queuing: Similar to PSTN call return, a call to a busy number can be queued until the callee can accept it. The caller can hang up their phone and the PBX will ring them when the callee answers.

Conference calling: Two or more parties can be connected to one another by dialing into a conference bridge number.

Call parking: An established call at one number can be put on hold and then reestablished from another number. This is useful when call transfer is not warranted.

Executive override: A privileged individual can break into an established call. After a warning tone to the two participants, the call becomes a three-way call.

While the CLASS and PBX features have enhanced the offerings of service providers that use the PSTN, the features are nevertheless limited in their flexibility and scope. The effect to the user is that the features become clumsy and difficult to use. For example, in order to use the Call Forwarding function, the user must perform the steps at the user's own phone prior to moving to the location of the telephone to which calls will be forwarded. A more desirable approach, from the standpoint of usefulness to the user, would be to perform the steps at the telephone to which calls will be forwarded.

Much of the lack of flexibility of the PSTN features is due to the lack of flexibility in the PSTN system itself. One problem with the PSTN is that the terminal devices (e.g. telephones) lack intelligence and operate as "dumb" terminals on a network having the intelligence in central offices. Most PSTN telephones are limited in functional capability to converting the analog signals they receive to sound and converting the sound from the handset to analog signals.

Some PSTN telephones have a display device and a display function to display specific information communicated from intelligent agents in the PSTN network using the PSTN signaling architecture. For example, some PSTN telephones have a display function to enable the Caller ID feature. Even such PSTN telephones are limited however by the closed PSTN signaling architecture, which prohibits access by the PSTN telephones to the network signaling protocols. The display functions are effectively limited to displaying text, again, as a "dumb" terminal.

The Internet presents a possible solution for distributing intelligence to telephony terminal devices. In Internet telephony, digitized voice is treated as data and transmitted across a digital data network between a telephone calls' participants. One form of Internet telephony uses a telephony gateway/terminal where IP telephony calls are terminated on the network. PSTN telephones are connected by a subscriber line to the gateway/terminal at the local exchange, or at the nearest central office. This form of Internet telephony provides substantial cost savings for users. Because the PSTN portion used in Internet telephony calls is limited to the local lines on each end of the call, long distance calls may be made for essentially the cost of a local call. Notwithstanding the costs savings provided by this form of Internet telephony, it is no more flexible than the PSTN with respect to providing enhancements and features to the basic telephone service.

In another form of Internet telephony, telephones are connected to access networks that access the Internet using a router. The telephones in this form of Internet telephony may be substantially more intelligent than typical PSTN telephones.

It would be desirable to incorporate CLASS and PBX features into a data network telephony system that uses a data network such as the Internet.

It would be desirable to provide new features and enhancements to telephony service that accommodates and conforms to users' needs.

It would also be desirable to provide features and capabilities to telephone service that create new opportunities for users and for service providers.

The present invention addresses the above needs by providing a system in a data network telephony system, such as for example, the Internet, that enables connected users to transmit user data, such as graphical data, on a computer to each other across a telephony network using telephones. The telephones may be linked to network communication devices, thereby creating the possibility of easily sharing graphic information. The system according to some embodiments of the present invention addresses concurrent voice and user data transmissions between users.

BRIEF DESCRIPTION OF THE DRAWINGS

Presently preferred embodiments of the invention are described below in conjunction with the appended drawing figures, wherein like reference numerals refer to like elements in the various figures, and wherein.

DETAILED DESCRIPTION OF THE PREFERRED EMBODIMENT

Figure 1:
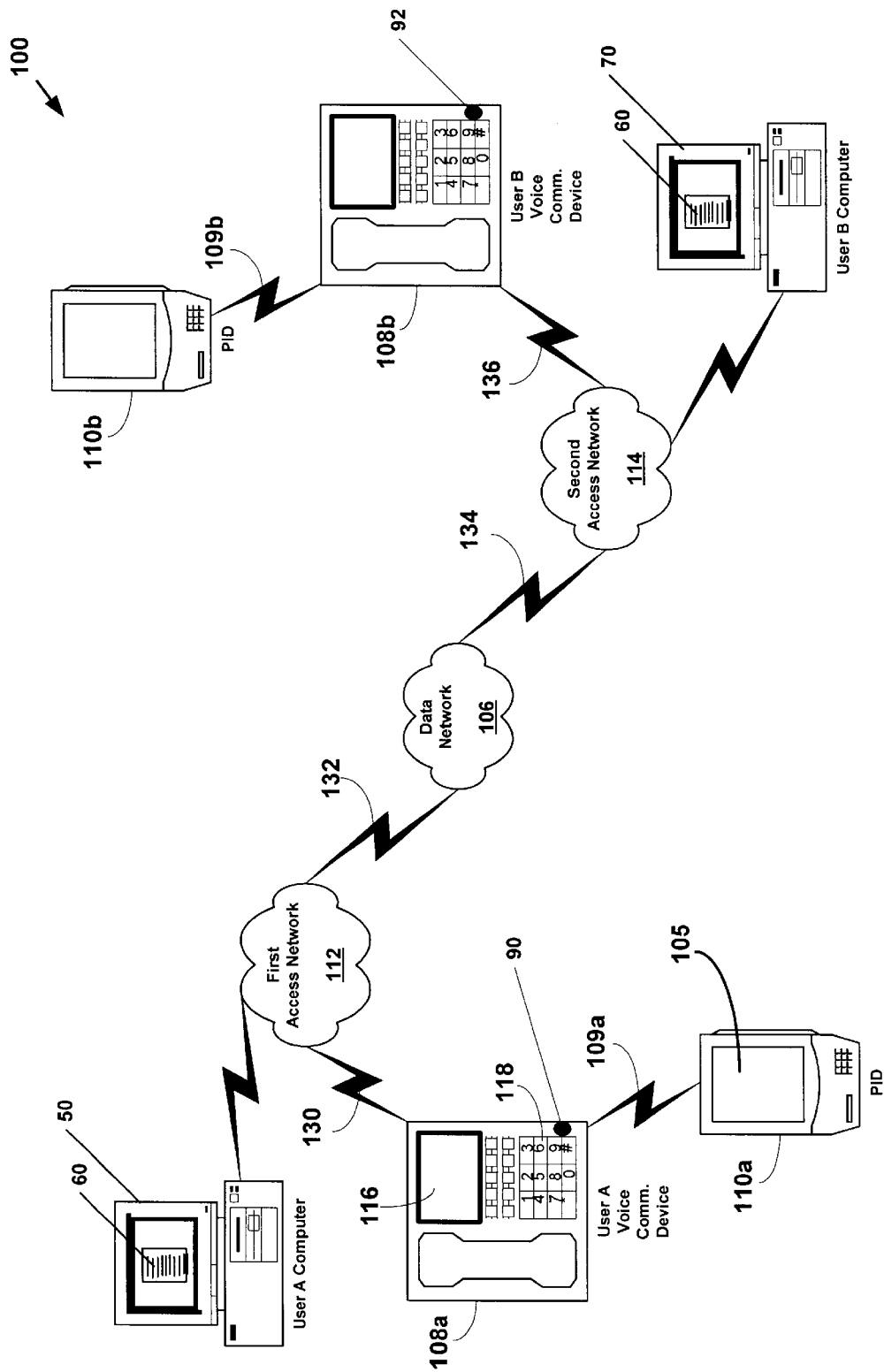
FIG. 1 is block diagram of a network telephony system according to one embodiment of the present invention.

The following patent applications owned by the assignee of the present application are incorporated be reference:

U.S. patent application Ser. No. 09/406,321 "System and Method for Controlling Telephone Service Using a Wireless Personal Information Device" to Schuster, et al., U.S. patent application Ser. No. 09/406,320 "System and Method for Advertising Using Data Network Telephone Connections" to Schuster et al., U.S. patent application Ser. No. 09/405,283 "System and Method for Providing User-Configured Telephone Service in a Data Network Telephony System" to Sidhu, et al., U.S. patent application Ser. No. 09/406,322 "System and Method for Accessing a Network Server Using a Portable Information Device Through a Network Based Telecommunication System" to Schuster, et al., U.S. patent application Ser. No. 09/406,152 "System and Method for Interconnecting Portable Information Devices Through a Network Based Telecommunication System" to Schuster, et al., U.S. patent application Ser. No. 09/405,981 "System and Method for Enabling Encryption on a Telephony Network" to Schuster, et al., U.S. patent application Ser. No. 09/406,128 "System and Method for Using a Portable Information Device to Establish a Conference Call on a Telephony Network" to Schuster, et al., now U.S. Pat. No. 6.577,622;

U.S. patent application Ser. No. 09/406,151 "System and Method for Associating Notes with a Portable Information Device on a Network Telephony Call" to Schuster, et al., U.S. patent application Ser. No. 09/406,298 "System and Method for Providing Shared Workspace Services Over a Telephony Network" to Schuster, et al., U.S. patent application Ser. No. 09/406,066 "System and Method for Providing Service Provider Configurations for Telephones in a Data Network Telephony System" to Schuster, et al., U.S. patent application Ser. No. 09/451,388 "System and Method for Providing User Mobility Services on a Telephony Network" to Schuster, et al., now U.S. Pat. No. 6,446,127;

U.S. patent application Ser. No. 09/470,879 "System and Method for Providing Call-Handling Services on a Telephony Network" to Schuster, et al., now U.S. Pat. No. 6,584,490;

U.S. patent application Ser. No. 09/181,431 "Method Apparatus and Communication System for Companion Information and Network Appliances" to Wang, et al. now U.S. Pat. No. 6.161,134;

U.S. patent application Ser. No. 09/321,941 "Multiple ISP Support for Data Over Cable Networks" to Ali Akgun, et al., Attorney Docket No. 98,638;

U.S. patent application Ser. No. 09/218,793 "Method and System for Provisioning Network Addresses in a Data-Over-Cable System" to Ali Akgun, et al., now U.S. Pat. No. 6.657,991; and U.S. patent application Ser. No. 08/887,313 "Network Access Methods, Including Direct Wireless to Internet Access" to Yingchun Xu, et al., now U.S. Pat. No. 6.151.628.

The following patent applications owned by the assignee of the present application and filed concurrently with the application herewith, are incorporated by reference:

- U.S. patent application Ser. No. 09/515.365 "System And Method For Providing Telephone Service Having Private Branch Exchange Features In A Data Network Telephony System" to Schuster et al., Attorney Docket No. 99,366.
- U.S. patent application Ser. No. 09/515.798 "System And Method For Providing A Wireless Data Network Telephone System" to Schuster et al., Attorney Docket No. 99,590.
- U.S. patent application Ser. No. 09/515.969 "System And Method For Accessing A Network Server Using A Portable Information Devices Through A Network Based Telecommunication System" to Schuster et al., Attorney Docket No. 99,592.
- U.S. patent application Ser. No. 09/516.269 "System And Method For Accessing Radio Programs Using A Data Network Telephone In A Network Based Telecommunication System" to Schuster et al., Attorney Docket No. 99,742.
- U.S. patent application Ser. No. 09/515.366 "System And Method For Providing Local Information In A Data Network Telephony System" to Schuster et al., now U.S. Patent No. 6.650.901.
- U.S. patent application Ser. No. 09/515.795 "System And Method For Enabling A Portable Information Device For Use In A Data Network Telephone System" to Schuster et al., Attorney Docket No. 99,741.
- U.S. patent application Ser. No. 09/515.364 "Dialing Token For Initiating A Telephone Connection In A Data Network Telephone System" to Schuster et al., Attorney Docket No. 99,375.
- U.S. patent application Ser. No. 09/515.797 "Flexible Dial Plan for a Data Network Telephony System" to Schuster, et al., Attorney Docket No. 99,374.
- U.S. patent application Ser. No. 09/515.387 "Personalized Call Announcement on a Data Network Telephony System" to Schuster, et al., Attorney Docket No. 99,597.
- U.S. patent application Ser. No. 09/515.970 "Personalizing a Data Network Appliance on a Data Network Telephony System" to Schuster, et al., Attorney Docket No. 99,598.
- U.S. patent application Ser. No. 09/515.796 "Proximity-Based Registration on a Data Network Telephony System" to Schuster, et al., Attorney Docket No. 99,599.

A. Data Network Telephony System

FIG. 1 is a block diagram showing an exemplary embodiment of a system 100 for providing screen-sharing services between a first computer 50 and a second computer 70 according to the present invention. A first voice communication device 108a is linked to a first access network 112 via connection 130 to communicate over a data network 106 by connecting via the first access network 112. A second voice communication device 108b is linked to a second access network 114 through connection 136 and may communicate over the data network 106 by connecting via the second access network 114. The first computer 50 is associated with the first voice communication device 108a and the second computer 70 is associated with the second voice communication device 108b. The association between the first computer 50 and the first voice communication device 108a is based on the fact that both are communicably connected to the same access network 112. The association between the second computer 70 and the second voice communication device 108b is also based on the fact that both are communicably connected to the same access network 114.

The data network 106 in the system 100 typically includes one or more Local Area Networks (LANs) connected to one another or to a Wide-Area Network (WAN), such as an Internet Protocol (IP) network, to provide wide-scale data connectivity. The data network 106 may use Voice Over Packet (VOP) schemes in which voice signals are carried in data packets. The network 106 may also include a connection to the Public Switched Telephone Network (PSTN) to allow for voice connections using traditional circuit switching techniques. In one embodiment, the data network 106 may include one or more LANs such as Ethernet LANs and support data transport protocols for performing Voice-over-Internet-Protocol (VoIP) techniques on the Internet. For further details regarding VoIP, see the information available through the Internet Engineering Task Force (IETF) at ietf.org. In addition, an Internet Telephony gateway may be included within the system 100 to allow for voice connections to users connected by subscriber lines at a PSTN Central Office.

The voice communication devices 108a–b (described further below with reference to FIG. 3) typically include a voice input, a voice output and a voice processing system. The voice processing system converts voice sound to digital data signals that are communicated on a voice connection over the data network. The voice processing system also converts digital data signals received from the voice connection to voice sound. The voice communication devices 108a–b typically include a central processing unit and memory to store and process computer programs. Additionally, each voice communication device 108a–b typically includes a unique network address, such as an IP address, in memory to uniquely identify it to the data network 106 and to permit data packets to be routed to the device.

The voice communication device 108a–b also include a screen-shot button 90 which, when pressed causes a screen-shot request message to be sent to the computer 50, 70 associated with the voice communication device 108a–b. For example, if the screen-shot button 90 on voice communication device 108a is pressed, the screen-shot request message is sent to the first computer 50. The first computer 50 captures an image 60 using a screen shot and sends it back to the first voice communication device 108a. The first voice communication device 108a formats the screen shot into a data message to transmit to the second voice communication device 108b. The second voice communication device 108b receives the screen shot, which it communicates to the second computer 70. The second computer 70 then displays the image 60 on its display.

A first PID 110a linked to the first voice communication device 108a via connection 109a may communicate over the data network 106 by connecting via the first access network 112. A second PID 110b linked to the second voice communication device 108b via connection 109b may communicate over the data network 106 by connecting via the second access network 114. The PIDs 110a–b each contain user attributes stored in a user information data base. The user attributes may contain such information as a user identifier, schedule information, and other information that is associated with a user of the PID 110a or 110b. The PIDS 110a–b each include a user interface allowing a user to easily enter and retrieve data. In a preferred embodiment, the user interface includes a pressure-sensitive display that allows a user to enter input with a stylus or other device. An example of a PID with such an interace is a PDA (Personal Digital Assistant), such as one of the Palm® series of PDAs offered by 3Com® Corporation. The PIDs 110a–b may include other functionality, such as wireless phone or two-way radio functionality.

Links 109a–b are point-to-point links, and may entirely or partially wireless, or they may be hard-wired connections. Each of the links 109a–b is preferably a wireless link, such as an infrared link specified by the Infrared Data Association (IrDA) (see irda.org for further information) or a radio frequency (RF) link such as the Bluetooth system (see bluetooth.com for further information). However, the point-to-point link can also be a hardwired connection, such as an RS-232 serial port.

In one embodiment, the voice communication device 108a includes a handset with a receiver and transmitter similar or identical to handsets of traditional circuit-switched telephones. A console on which the handset sits may include the voice processing system, a display 116, and a keypad 118.

In a preferred embodiment, a portion of the voice communication device 108a utilizes an NBX 100™ communication system phone offered by 3Com® Corporation. In alternative embodiments, the voice communication device 108a may include any device having voice communications capabilities. For example, a personal computer having a microphone input and speaker output may also be used to implement the voice communication device 108a. Other configurations are also intended to be within the scope of the present invention.

The details relating to operation of the voice communication devices 108a and 108b depend on the nature of the data network 106 and the nature of the access networks 112, 114 connecting the voice communication devices 108a and 108b to each other and/or to other network entities. The access networks 112, 114 typically include any high bandwidth network adapted for data communications, i.e. a network having greater than 64,000 bits-per-second (bps) bandwidth. The access networks 112, 114 may link to the voice communication devices 108a–b using an Ethernet LAN, a token ring LAN, a coaxial cable link (e.g. CATV adapted for digital communication), a digital subscriber line (DSL), twisted pair cable, fiberoptic cable, an integrated services digital network (ISDN) link, and wireless links. In embodiments that may not require bandwidth greater than 64,000 bps, the access networks 112, 114 may also include the PSTN and link the voice communications devices 108a–b by an analog modem. Further details regarding specific implementations are described below, with reference to FIGS. 2 through 10.

B. System for Communicating Computer Screens Using a Data Network Telephony System One advantage of the Data Network Telephony System 100 in FIG. 1 is that it may be used to communicate screen content over a telephone connection. In one embodiment, the voice communication device 108a may request a screen shot from the associated computer 50. The computer 50 retrieves the screen shot and sends it to the first voice communication device 108a. The first voice communication device 108a then sends the screen shot to the second voice communication device 108b. The second voice communication device 108b sends the screen shot to the second computer 70 for display.

1. Local Area Network As An Exemplary Access Network

Figure 2:
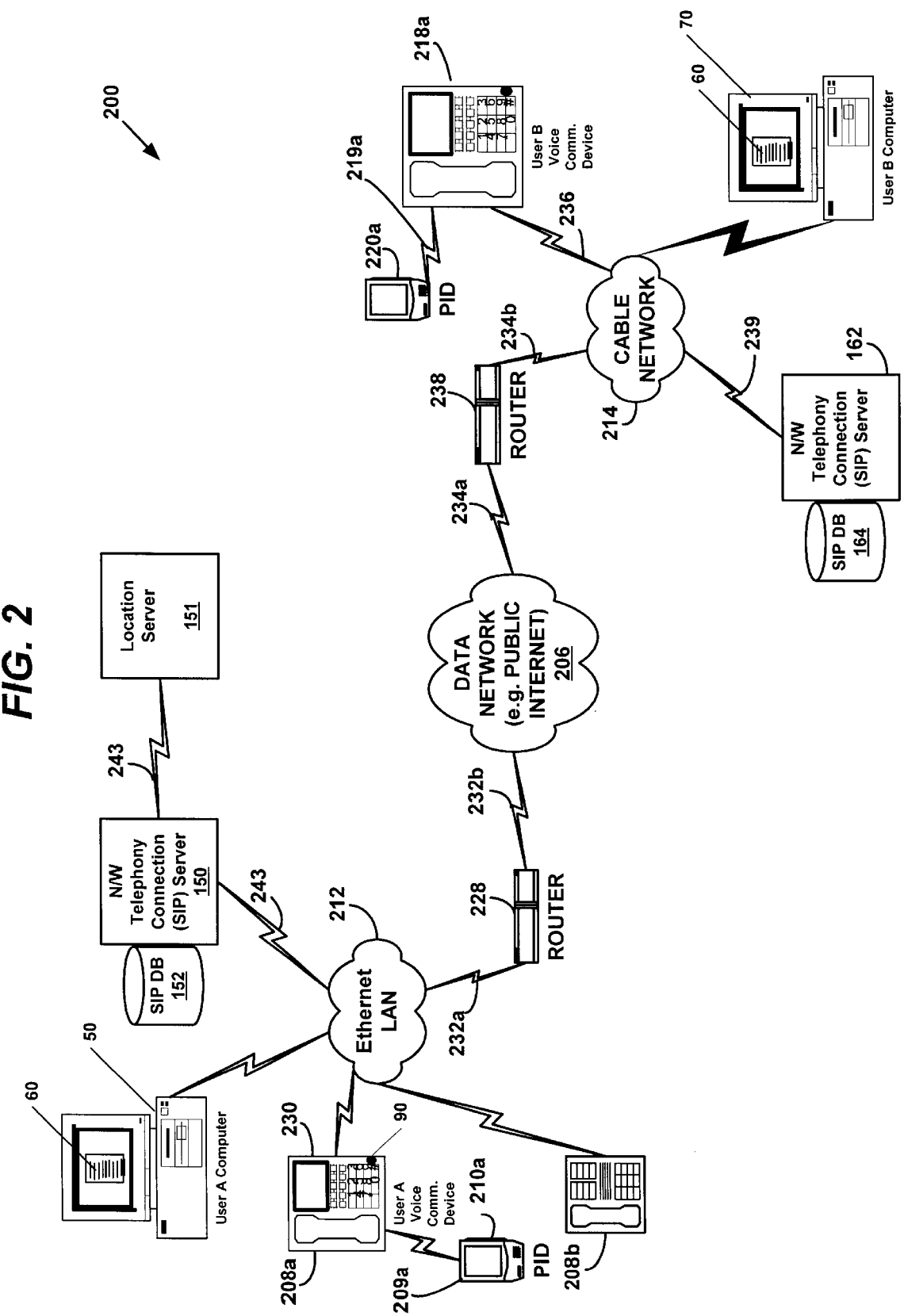
FIG. 2 is a block diagram showing a system for communicating graphic images on a telephony system according to an exemplary embodiment of the present invention.

FIG. 2 is a block diagram showing one example of the system 100 of FIG. 1 for providing shared workspace services according to the present invention. The system 200 in FIG. 2 includes a local area network 212, connected to a data network 206 by a first router 228. A cable network 214 is connected to the data network 206 by a second router 238. Those of ordinary skill in the art will appreciate that while FIG. 2 illustrates the access networks as the local area network 212 and the cable network 214, any other type of network may be used. For example, the local area network 212 and/or the cable network 214 may be replaced by ISDN, DSL, or any other high-speed data link.

The local area network 212 provides data connectivity to its network elements, such as a first data network telephone 208a, a second data network telephone 208b, and a first network telephony connection server 150. The local area network 212 in FIG. 2 is an Ethernet LAN operating according to the IEEE 802.3 specification, which is incorporated by reference herein, however, any other type of local area network may be used. The local area network 212 uses the router 228 to provide the data network telephone 208a and the first network telephony connection server 150 with access to the data network 206. For example, the router 228 may perform routing functions using protocol stacks that include the Internet Protocol and other protocols for communicating on the Internet.

The first network telephony connection server 150 provides telephony registration, location and session initiation services for voice connections in which its members are a party. A user may register for telephony service with an administrator of the first network telephony connection server 150 and receive a user identifier and a telephone identifier. The user identifier and telephone identifier may be sequences of unique alphanumeric elements that callers use to direct voice connections to the user. The first network telephony connection server 150 registers users by storing user records in a first registration database 152 in response to registration requests made by the user.

The call setup process and the user and telephone identifiers preferably conform to requirements defined in a call management protocol. The call management protocol is used to permit a caller anywhere on the data network to connect to the user identified by the user identifier in a data network telephone call. A data network telephone call includes a call setup process and a voice exchange process. The call setup process includes steps and message exchanges that a caller and callee perform to establish the telephone call. The actual exchange of voice signals is performed by a data communications channel. The data communications channel incorporates other data transport and data formatting protocols, and preferably includes well-known data communications channels typically established over the Internet.

The call management protocol used in FIG. 2 is the Session Initiation Protocol (SIP), which is described in M. Handley et al., "SIP: Session Initiation Protocol," IETF RFC 2543, March 1999, incorporated by reference herein, however, any other such protocol may be used. Other protocols include H.323, the Media Gateway Control Protocol (MGCP), MEGACO, etc.

The network telephony connection server 150 may be used to provide telephony service for mobile users. A user may be registered to use the first network telephone 208a (which is identified by its telephone identifier), but move to a location near the second network telephone 208b. The user may re-register as the user of the second network telephone 208*b*. Calls that identify the user by the user's user identifier may reach the user at the second network telephone 208*b*.

2. Cable Network As An Exemplary Access Network

The system 200 in FIG. 2 also shows a cable network 214 connected to the data network 206 by a router 238. The cable network 214 provides data network access to its network elements, which in FIG. 2 include a third data network telephone 218*a* and a second network telephony connection server 162. The users of the data network telephone 218*a* connected to the cable network 214 may communicate over the data network 206 with the users of the data network telephones 218*a–b* connected to the local area network 212.

The cable network 214 includes any digital cable television system that provides data connectivity. In the cable network 214, data is communicated by radio frequency in a high-frequency coaxial cable. The cable network 214 may include a head-end, or a central termination system that permits management of the cable connections to the users.

3. Providing Telephony Services

The second network telephony connection server 162 is preferably a SIP-based server that performs call initiation, maintenance and teardown for the data network telephone 218*a* connected to the cable network 214. The second network telephony connection server 162 may be similar or identical to the first network telephony connection server 150 connected to the local area network 212.

The system 200 shown in FIG. 2 permits the data network telephones 208*a–b* connected to the local area network 212 to communicate with the data network telephone 218*a* connected to the cable network 214. The system shown in FIG. 2 uses SIP in order to establish, maintain, and teardown telephone calls between users.

There are two major architectural elements to SIP: the user agent (UA) and the network server. The UA resides at the SIP end stations, (e.g. the data network telephones), and contains two parts: a user agent client (UAC), which is responsible for issuing SIP requests, and a user agent server (UAS), which responds to such requests. There are three different network server types: a redirect server, a proxy server, and a registrar. The various network server types may be combined into a single server, such as the network telephony connection server 150 and 162. Not all server types are required to implement the embodiments of the present invention. The communication services to be provided will determine which servers are present in the communication system. Preferred embodiments of the present invention may be carried out using proxy servers.

One example of a SIP operation involves a SIP UAC issuing a request, a SIP proxy server acting as end-user location discovery agent, and a SIP UAS accepting the call. A successful SIP invitation consists of two requests: INVITE followed by ACK. The INVITE message contains a user identifier to identify the callee, a caller user identifier to identify the caller, and a session description that informs the called party what type of media the caller can accept and where it wishes the media data to be sent. User identifiers in SIP requests are known as SIP addresses. SIP addresses are referred to as SIP Uniform Resource Locators (SIP-URLs), which are of the form sip:user@host.domain. Other addressing conventions may also be used.

Redirect servers process an INVITE message by sending back the SIP-URL where the callee is reachable. Proxy servers perform application layer routing of the SIP requests and responses. A proxy server can either be stateful or stateless. A stateful proxy holds information about the call during the entire time the call is up, while a stateless proxy processes a message without saving information contained in the message. Furthermore, proxies can be either forking or non-forking. A forking proxy can, for example, ring several data network telephones at once until somebody takes the call. Registrar servers are used to record the SIP address (the SIP URL) and the associated IP address. The most common use of a registrar server is for the UAC to notify the registrar where a particular SIP URL can be reached for a specified amount of time. When an INVITE request arrives for the SIP URL used in a REGISTER message, the proxy or redirect server forwards the request correctly.

At the local area network 212, the central registrar/proxy server, such as the first network telephony server 150, is the primary destination of all SIP messages trying to establish a connection with users on the local area network 212. Preferably, the first network telephony server 150 is also the only destination advertised to the SIP clients outside the LAN 212 on behalf of all the SIP clients residing on the LAN 212. The network telephony server 150 relays all SIP INVITE messages to the appropriate final destination (or another SIP proxy), based on a database lookup using the first SIP database 152. It allows all mobile clients to register with their current locations.

Similarly, the second network telephony server 162 is the primary destination of all SIP messages trying to establish a connection with the data network telephone 218*a* connected to the cable network 214. Preferably, the second network telephony server 162 is also the only destination advertised to the SIP clients outside the cable network 214 on behalf of all the SIP clients (e.g. data network telephones) residing on the cable network 214. The second network telephony server 162 relays all SIP INVITE messages to the appropriate final destination (or another SIP proxy), based on a database lookup using the second SIP database 164.

The data network telephones 218*a–b* and 218*a* in the system 200 preferably have pre-programmed device identifiers (e.g. phone numbers), represented as SIP-URL's that are of the form sip: user@domain. An example is sip: 8475551212@3Com.com. After power-up, each of the data network telephones 218*a–b* and 218*a* sends a SIP REGISTER message to the default registrar, such as the network telephony servers 150 and 162. When a call arrives at one of the network telephony servers 150 or 162 for any of the registered SIP URLs, the server will forward the call to the appropriate destination. If a data network telephone is moved to a new location, all calls to the associated SIP URL will still be properly routed to that device. In other words, the system in FIG. 2 provides device mobility in the sense that calls will "follow" the data network telephone according to its SIP URL. This is especially useful if the data network telephone 218*a–b* or 218*a* is running the DHCP (Dynamic Host Configuration Protocol) so that when the location is changed, the IP address is also automatically changed.

An advantage of the system in FIG. 2 is that once the call is established between data network telephones, the data network 206 provides data connectivity for a plurality of data communications channels. For example, the data network telephones 208*a* and 218*a* can communication voice signals as voice-over-data packets on a voice-over-data channel. The data network telephones 208*a* and 218*a* can also communication graphical data as graphical data packets on a graphic data channel. For example, the graphical data may be communicated to and from the PIDs 210*a* and 220*a* across links 209*a* and 219*a* to the data network telephones 208*a* and 218*a*, where graphical data is packetized and depacketized as part of the process for communicating the graphical data packets across the data network 206 and any access networks, such as the Ethernet LAN 212 and the cable network 214.

Another advantage of the system shown in FIG. 2 is that the SIP protocol may be used during a telephone connection to communicate graphical information from one computer 50 to the second computer 70. For example, during the telephone conversation, User A at data network telephone 208a may decide to send the image 60 of his/her computer screen to User B for display on his/her computer 70. User A may initiate the process by pressing the screen share button 90 on the data network telephone 208a. In response, the data network telephone requests a screen shot from User A's computer 50. User A's computer 50 includes a screen shot application that receives the request from the Ethernet LAN 212, retrieves the screen shot and sends to screen shot image 60 back to the device that requested it, in this case, data network telephone 208a.

The data network telephone 208a sends a SIP Invite message to the second data network telephone 208b in which the session description protocol defines an application type of SCREEN SHOT having graphical image data. The session description protocol may be defined in accordance with the SIP protocol to accommodate the communication of screen images. In the SIP ACK message, the first data network telephone 208a communicates the image 60 retrieved from the screen on the first computer 50 to the second data network telephone 208b. The second data network computer 208b receives the image 60 and sends it to its associated computer 70 for display.

4. The Data Network Telephones

The data network telephones 218a–b are preferably telephones that include an Ethernet communications interface for connection to an Ethernet port. The Ethernet phones in FIG. 2 support the Internet Protocol (IP), using an IP address that is either statically configured or obtained by access to a Dynamic Host Configuration Protocol (DHCP) server. The data network telephone 208a may also communicate with other devices on the Ethernet, such as the computer 50.

Figure 3:
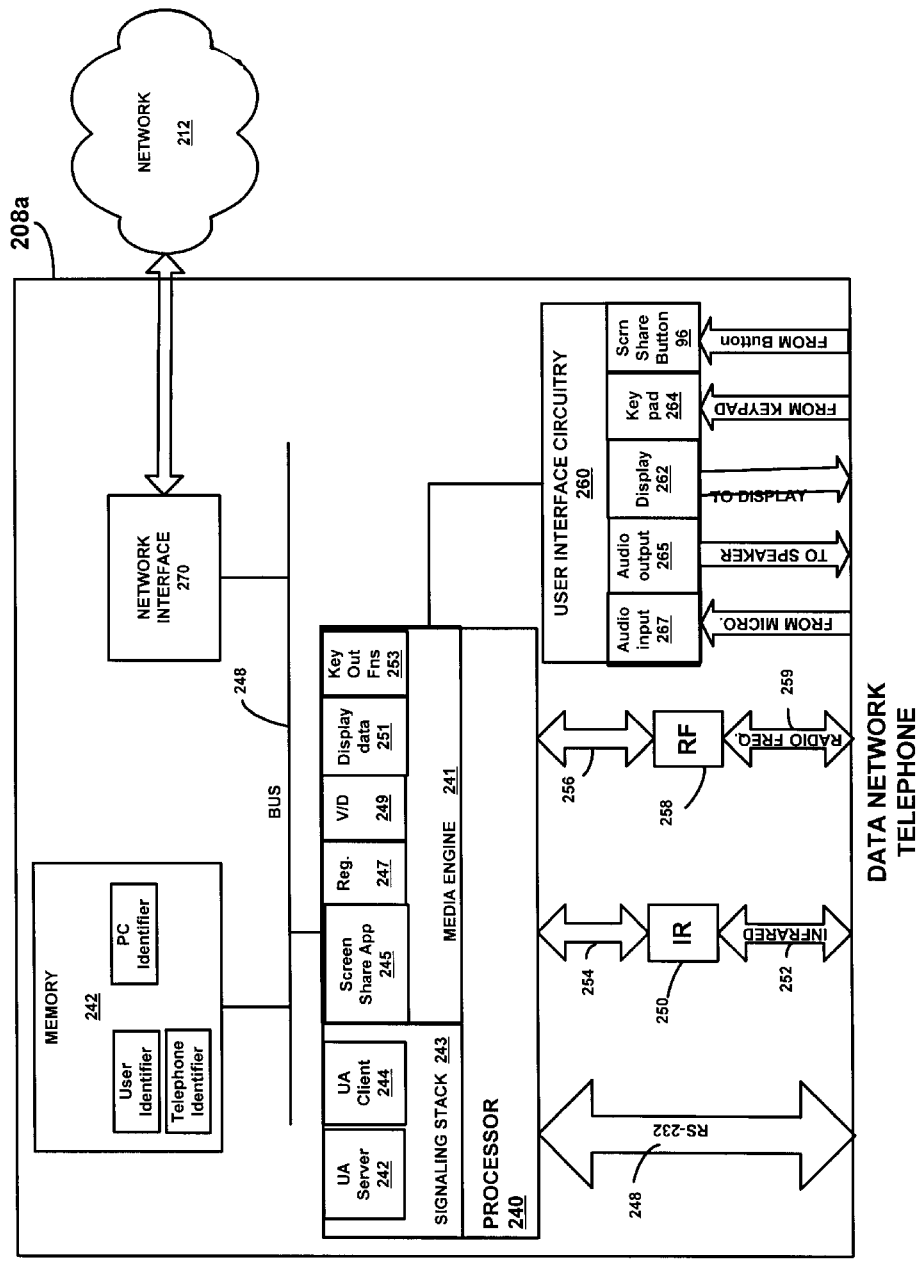
FIG. 3 is a block diagram of a data network telephone according to an exemplary embodiment of the present invention.

FIG. 3 is a block diagram showing the data network telephone 208a connected to the local area network 212 in FIG. 2. The data network telephone 208a in FIG. 3 is connected to the network 212 by a network interface 270. The network interface 270 may, for example, be a network interface card, and may be in the form of an integrated circuit. A bus 248 may be used to connect the network interface 270 with a processor 240 and a memory 242. Also connected to the processor are user interface circuitry 260 and three alternative link interfaces to a PID, such as the PID 210a.

A first link interface 248 includes an RS-232 serial connection and associated coupling hardware and mechanisms. The first alternative link interface 248 may, for example, be a docking cradle for a PDA (Personal Digital Assistant), in which information can be transferred between the PDA and the data network telephone 208a. The second alternative link interface comprises a first connection 254, such as an RS-232 connection, along with infrared circuitry 250 for converting signals into infrared output and for accepting infrared input. An infrared interface 252 may also be included within the second alternative link interface. The third alternative link interface comprises a first connection 256, such as an RS-232 connection, along with radio-frequency circuitry 258 for converting signals into radio frequency output and for accepting radio frequency input. A radio frequency interface 259 may also be included as part of the third alternative link interface.

The three alternative link interfaces described above are merely examples, and additional means for implementing the link interface between the data network telephone 208a and the PID 210a may also be used. Although three link interfaces are shown in FIG. 3, there may be only one such interface in the data network telephone 208a. More than one link interface may be included to improve flexibility and to provide redundancy in case of failure of one of the link interfaces.

The user interface circuitry 260 includes hardware and software components that access the functions of the handset, display, and keypad to provide user input and output resources for functions in the processor 240. The user interface circuitry includes a display interface 262, a keypad interface 264, an audio output interface 265, an audio input interface 267 and a screen share button function 96.

The audio input interface 267 may receive voice signals from a microphone or other audio input device and convert the signals to digital voice information. The conversion preferably conforms to the G.711 ITU Standard. Further processing of the digital signal may be performed in the audio input interface 267, such as providing compression (e.g. using G.723.1 standard) or providing noise reduction, although such processing may also be performed in the processor 240. Alternatively, the audio input interface 267 may communicate an analog voice signal to the processor 240 for conversion to digital information within the processor 240.

The audio output interface 265 receives digital information representing voice from the processor 240 and converts the information to audible sound, such as through a magnetic speaker. In one embodiment, the audio output interface 265 receives information in the form of G.711, although other processing such as decompression may be performed in the audio output interface 265. Alternatively, the processor 240 may convert digital information to analog voice signals and communicate the analog voice signals to the audio output interface 265.

The keypad interface 264 and the display interface 262 include well-known device interfaces and respective signal processing techniques. The user interface circuitry 260 may support other hardware and software interfaces. For example, a videophone implementation might also include a camera and monitor. The data network telephones of the present invention are not limited to telephones or videophones—additional user interface types, for example, such as the ones needed for computer games, are also contemplated as being within the scope of the present invention. In addition, some of the features described here, such as the display interface 262, are optional and serve to enhance the functionality of the first data network telephone 208a.

The screen share button function 96 communicates a press of the button to the processor 240 for processing.

The processor 240 may consist of one or more smaller processing units, including, for example, a programmable digital signal processing engine. In the preferred embodiment, the processor is implemented as a single ASIC (Application Specific Integrated Circuit) to improve speed and to economize space. The processor 240 also may include an operating system, and application and communications software to implement the functions of the data network telephone 208a. The operating system may be any suitable commercially available embedded or disk-based operating system, or any proprietary operating system.

The processor 240 includes a media engine 241 and a signaling stack 243 to perform the primary communications and application functions of the data network telephone 208a. The purpose of the signaling stack in the exemplary data network telephone 208a is to set up, manage, and tear down a call. During the setup phase, a user may use the keypad to enter a user identifier to call. Alternatively, a PID such as PID 210a may transmit the user identifier of the party across the first link 209a. The signaling stack 243 receives the user entry and formats a request message to send to the user identified by the user identifier to initiate a telephone call. When the request message is sent, the location of the user identified by the user identifier is discovered, communication parameters, such as the supported voice CODEC types are exchanged, and a voice-over-data channel is established. During the management phase, for example, other parties may be invited to the call if needed. During the tear down phase, the call is terminated.

The signaling protocol used in the data network telephone 208a in FIG. 3 is the SIP protocol. In particular, the signaling stack implements a User Agent Client 244 and a User Agent Server 242, in accordance with the SIP protocol. Alternative signaling protocols, such as the ITU-T H.323 protocol, MGCP, MEGACO, and others, may also be used to implement the present invention.

Once the call is set up, the media engine 241 manages the communication over one or more data communications channels using network transport protocols and the network interface 270. The media engine 241 sends and receives data packets having a data payload for carrying data and an indication of the type of data is being transported. The media engine 241 in the data network telephones 208a may sample the voice signals from the audio input 267 (or receive voice samples from the audio input 267), encode the samples, and build data packets on the sending side. On the receiver side, in addition to performing the reverse operations, the media engine also typically manages a receiver buffer to compensate for network jitter. Similar procedures may be performed for other types of data, such as graphical data.

The media engine 241 may also include hardware and software components for performing registration functions 247, voice-over-data functions 249, display data functions 251, and keypad output functions 253. The media engine 241 processes data that is received from the network 212, and data to be sent over the network 241.

For data that is received from the network 212, the media engine 241 may determine from the type of data in the packet (such as by examining a packet header) whether packets contain sampled voice signals or other data types. Packets containing sampled voice signals are processed by the voice-over-data function 249. The voice-over-data function 249 preferably conforms to a protocol for formatting voice signals as digital data streams. While any suitable protocol may be used, the media (i.e. the voice signal) is preferably transported via the Real Time Protocol (RTP), which itself is carried inside of UDP (User Datagram Protocol). RTP is described in H. Schulzrinne et al., "RTP: A Transport Protocol for Real-Time Applications," IETF RFC 1889, January 1996, which is incorporated herein by reference. UDP is described in J. Postel, "User Datagram Protocol," IETF RFC 768, August 1980, and IP is described in J. Postel, ed., "Internet Protocol," IETF RFC 791, September 1981, both of which are incorporated by reference herein.

Packets containing data for use in registering the data network telephone 208a with a network telephony service are processed by the registration function 247. By registering the data network telephone 208a, a user may establish with the network telephony connection server 150 that calls addressed to the user's user identifier may be connected to the data network telephone 208a. Registration may occur when the data network telephone 208a sends a request to register to a service provider host, such as the network telephony connection server 150. The service provider host may respond by setting the user's user identifier to correspond to the telephone identifier of the data network telephone 208a, and by acknowledging the request with a status message to the data network telephone 208a. In one embodiment, a request to register the data network telephone 208a to a default user is automatically sent during power-up of the data network telephone 208a.

Other features may be added to the registration functions 247, or implemented as extensions to the registration functions 247. For example, the first data network telephone 208a may be provisioned to provide selected network telephony services by establishing a data connection with a service provider, requesting the selected services, and receiving data that ensures that the services have been successfully provisioned. Such services may include, for example, caller identification, call forwarding, voice mail and any other services offered by the network telephony service provider to enhance the capabilities of the first data network telephone 208a. One advantage of provisioning functions is that services may be ordered for temporary use in a manner convenient to the user.

Packets containing data for display on a display device of the data network telephone 208a are processed by the display data function 251. The display data function 251 may be used for displaying, for example, the names and user identifiers of other parties to the call, the status of the telephone call, billing information, and other information.

For data to be sent over the data network 212, the media engine 241 formats the data as data packets in accordance with a selected protocol. The selected protocol is preferably a protocol that is supported by data network telephones that will receive the data being transported.

The voice-over-data function 249 formats voice samples according to the protocol used by the receiving data network telephone. In one preferred embodiment, the voice over data function 249 formats voice samples as RTP packets. The registration function 247 and the keypad output function 253 may control the transport of data that does not represent voice signals.

The media engine 241 includes a screen share application 245 for processing requests for screen shots that are to be transmitted to another party, or to be displayed on the computer 50. The screen share application 245 processes the button press indication that is received from the screen share button function 96. In response to the button press, the screen share application 245 prepares a screen shot request message to send to the computer 50 over the Ethernet 212. The screen share application 245 includes functions that receive the image 60 from the computer 50. When the image 60 is received, the screen share application 245 invokes the signaling stack 243 to issue a session initiation. If SIP is used, the signaling stack 243 sends a SIP Invite message to another data network telephone (e.g. data network telephone 208b in FIG. 2). The SIP Invite message is formatted to include a session description protocol (SDP) that provides for the communication of a graphical image with an application type of SCREEN SHOT.

The screen share application 245 in the second data network telephone 208b interprets the SIP Invite SDP to receive the screen shot image in the SIP ACK message. The screen share application 245 in the first data network telephone 208a sends the SIP ACK message that includes the image 60 in response to a 200 OK message from the second data network telephone 208b. The screen share application 245 in the second data network telephone 208b receives the image 60 in the ACK message and sends the image 60 to the second computer 70.

The data network telephones 208b and 218a are preferably similar or identical to the data network telephone 208a. For each of the data network telephones 218a–b and 218a, many of the features described in FIG. 3 are optional and their inclusion depends on the services to be offered.

5. The Portable Information Devices (PIDs)

Figure 4:
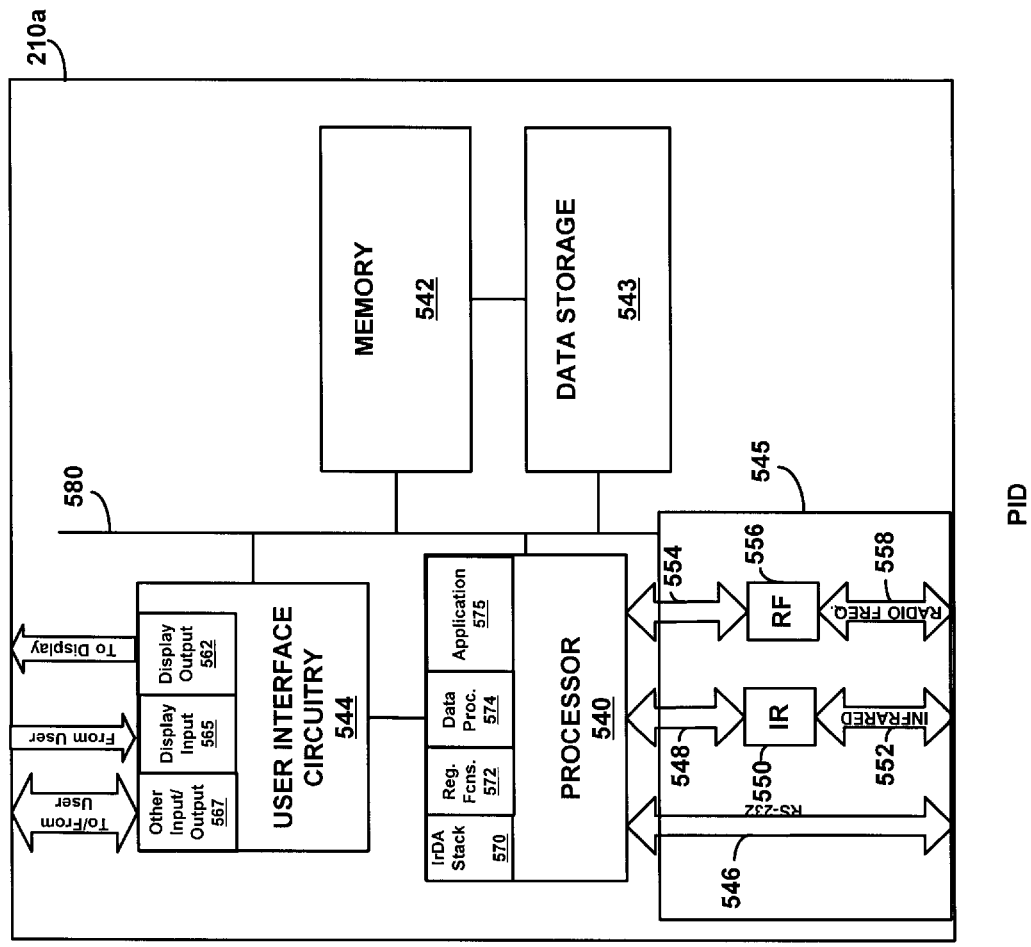
FIG. 4 is a block diagram of a portable information device (PID) according to an exemplary embodiment of the present invention.

FIG. 4 is a block diagram showing the exemplary PID 2110a that can communicate via the link 209a with the data network telephone 208a connected to the LAN 212. The PID 210a may be linked to the data network telephone 208a through a link interface 545. A bus 580 may be used to connect the point-to-point interface 545 with a processor 540, a memory 542, data storage 543, and user interface circuitry 544.

The link interface 545 shown in FIG. 4 illustrates three alternative link interfaces for establishing a link to a data network telephone, such as the data network telephone 208a.

A first link interface 546 includes an RS-232 serial connection and associated coupling hardware mechanisms. The first alternative link interface 546 may, for example, be for coupling with a PDA docking cradle, in which information can be transferred between the PDA and the data network telephone 208a. The second alternative link interface comprises a first connection 548, such as an RS-232 serial connection, along with infrared circuitry 250 for converting signals into infrared output and for accepting infrared input. An infrared interface 552 may also be included within the second alternative link interface. The third alternative link interface comprises a first connection 554, such as an RS-232 connection, along with radio-frequency circuitry 556 for converting signals into radio frequency output and for accepting radio frequency input. A radio frequency interface 558 may also be included as part of the third alternative interface. The radio interface 554/556/558 may be implemented according to the Bluetooth specifications, described at bluetooth.com.

The three alternative link interfaces described above are merely examplary, and additional means for implementing the interface between the PID 210a and the data network telephone 208a may also be utilized. Although three link interfaces are shown in FIG. 4, there may be only one such interface in the PID 210a. More than one link interface may be included to improve flexibility and to provide redundancy in case of failure of one of the link interfaces.

The user interface circuitry 544 includes hardware and software components that provide user input and output resources for functions in the processor 540. The user interface circuitry includes a display output 562, a display input 565, and an additional input/output interface 567.

The display output 562 preferably receives digital information representing graphical data from the processor 540 and converts the information to a graphical display, such as text and/or images, for display on a display screen, for example.

The display input 565 may receive data inputs, such as graphical data inputs, from a user of the PID 210a. The graphical data inputs are preferably entered by the user with a stylus on a pressure-sensitive display screen, and may include text, drawings, or other objects that are capable of being graphically presented.

The additional input/output interface 567 allows the user to enter other types of data besides graphical data into the PID 210a. For example, audio data, additional graphical data, or additional input, such as video camera input for example, may be entered through the additional input/output interface 567. Touch-sensitive screen buttons are an exemplary method for a user to enter control data into the PID 210a.

The processor 540 may include an operating system, as well as application and communication software, to implement the functions of the PID 210a. The operating system may be any suitable commercially available operating system, or any proprietary operating system. The operating system and software may be stored on data storage 543, in the memory 542, or the may be embedded in the processor 540. Although the processor 540 is shown connected to the data storage 543 through a bus 580, other configurations may also be used. Similarly, the memory 542 may be configured other than as shown in FIG. 4, and may be embedded within the processor 540.

The PID 210a is able to send data to and receive data from the data network telephone 208a across a point-to-point link, such as the point-to-point link 209a shown in FIG. 1. A user enters graphical data at the display input 565. The graphical data may be processed in the user interface circuitry 544 or it may go directly to the processor 540 or the memory 542. The processor 540 may also perform processing functions, such as compression. A graphical data application may be used to implement the display input, the display output, and the processing functions. For example, a drawing application may be used to accept graphical data input, the display input 565 from a user drawing with a stylus on the display screen of a PDA. A drawing application could then display the drawing through the display output 562 to enable the user to see a visual representation of the drawing. If the user desires to share the drawing with a second user on the system 200, where the second user is using a second PID such as PID 220a, the graphical data from the drawing application can be transmitted through one of the point-to-point interfaces 545, allowing the data to be received by the data network telephone 208a. An application in the data network telephone 208a receives the graphical data across the point-to-point link, and the graphical data is prepared for transmission across the data network 206, such as by the media engine 241 shown in FIG. 3. Preferably the graphical data is converted to graphical data packets and is communicated on a graphical data channel across the LAN 212 through the router 228 across the data network 206 through the second router 238 across the cable network 214 to the third data network telephone 218a. The third data network telephone 218a converts the graphical data packets received on the graphical data channel into graphical data. The graphical data is then transmitted across a point-to-point link to the second PID 220a, where it may be displayed on a display screen on the PID 220a. The PID 220a may contain a similar drawing program as that which was referenced to the PID 210a, allowing the user of the PID 220a to modify the drawing and transmit the modifications back across the point-to-point link to the third data network telephone 218a across the cable network 214 through the second router 238 across the data network 206 through the first router 228 across the LAN 212 to the first data network telephone 208a across the point-to-point link and back to the first PID 210a.

The point-to-point link 209a may be a serial bit stream between an application in the first PID 210a and an application in the first data network telephone 208a. For example, the link 209a could be an infrared link that is implemented with minimal stack interpretation. However, the link 209a between PID 210a and the first data network telephone 208a can alternatively be implemented as an infrared link using all or parts of a specialized protocol, such as the Infrared Data Association (IrDA) protocol stack, where data is interpreted through the stack between application-layer processes at each end of the link.

Figure 5:
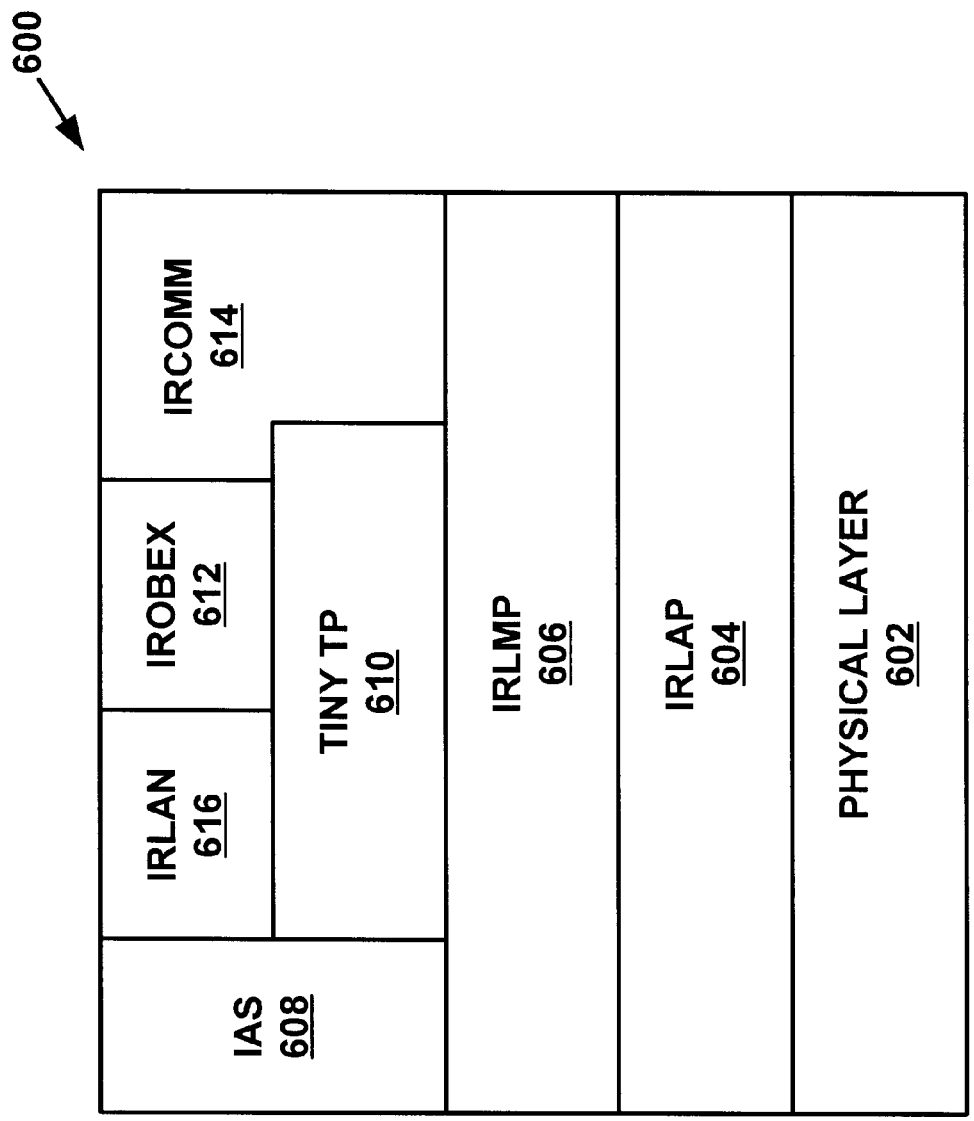
FIG. 5 is a stack layer diagram showing the layers of an IrDA stack.

FIG. 5 is a protocol diagram illustrating the layers of the IrDA protocol stack. An IrDA stack is implemented at each of the connection endpoints of an IrDA link. For example, the first PID 210a and the first data network telephone 208a could each implement an IrDA protocol stack to enable the link 209a. As a second alternative, two PIDs, such as the first PID 210a and the third PID 218a, may each contain an IrDA stack. In the second alternative, the communications between the PIDs and the data network telephones might take place without the assistance of IrDA. For example, IrDa data from the first PID 210a might be transmitted across the link 209a as a serial stream of data to the first data network telephone 208a, which might treat the IrDA data like any other data received from the first PID 210a. The first data network telephone 208a could then assemble the IrDA data into packets, such as TCP/IP packets for transport across the access and data networks to the third data network telephone 218a. The third data network telephone 218a may disassemble the packets and forward the IrDA data (without interpreting the IrDA portions) across the link 219a to the third PID 220a. The third PID 2The required layers of an IrDA protocol stack are the physical layer 602, the IrLAP layer 604, the IRLMP layer 606 and the IAS layer 608. The physical layer 602 specifies optical characteristics of the link, encoding of data, and framing for various speeds. The IrLAP (Link Access Protocol) layer 604 establishes the basic reliable connection between the two ends of the link. The IrLMP (Link Management Protocol) layer 606 multiplexes services and applications on the IrLAP connection. The IAS (Information Access Service) layer 608 provides a directory or "yellow pages" of services on an IrDA device.

The IrDA protocol also specifies a number of optional protocol layers, these protocol layers being TinyTP 610, IrOBEX 612, IrCOMM 614 and IrLAN 616. TinyTP (Tiny Transport Protocol) 610 adds per-channel flow control to keep traffic over the IrDA link moving smoothly. This important function is required in many cases. IrOBEX (Infrared Object Exchange protocol) 612 provides for the easy transfer of files and other data objects between the IrDA devices at each end of the link. IrCOMM 614 is a serial and parallel port emulation that enables existing applications that use serial and parallel communications to use IrDA without change. IrLAN (Infrared Local Area Network) 616 enables walk-up infrared LAN access for laptops and other devices. The use of the optional layers depends upon the particular application in the IrDA device. The IrDA protocol stack is defined by such standards documents as "IrDA Serial Infrared Physical Layer Link Specification", "'IrDA IrCOMM': Serial and Parallel Port Emulation over IR (Wire Replacement)", "IrDA Serial Infrared Link Access Protocol (IrLAP)", "IrDA Infrared Link Management Protocol (IrLMP)", and "IrDA 'Tiny TP': A Flow-Control Mechanism for use with IrLMP", and related specifications published by the IrDA and available at irda.org/standards/specifications.asp and is incorporated by reference herein.

In one embodiment, the data network telephones 208a and 218a merely provide a data tunnel for the data channel attendant to the infrared links, while the IrDA protocol stack is implemented at the endpoint PID devices 210a and 220a. Alternatively, IrDA stacks can be implemented in the data network telephones as well. By implementing additional layers of the IrDA protocol stack, the PID applications and the base applications in the data network telephones can be simplified because the IrDA protocol layers take over certain functions. For example, the IrDA protocol stack can be implemented at each PID 210a and 220a, and the IrOBEX layer 612 can be used to transfer text and graphics object files, such as drawings or electronic business cards, end-to-end between PID devices connected via data network telephones and networks.

6. Providing Telephony, Shared Workspace and Screen Share Services

Figure 6:
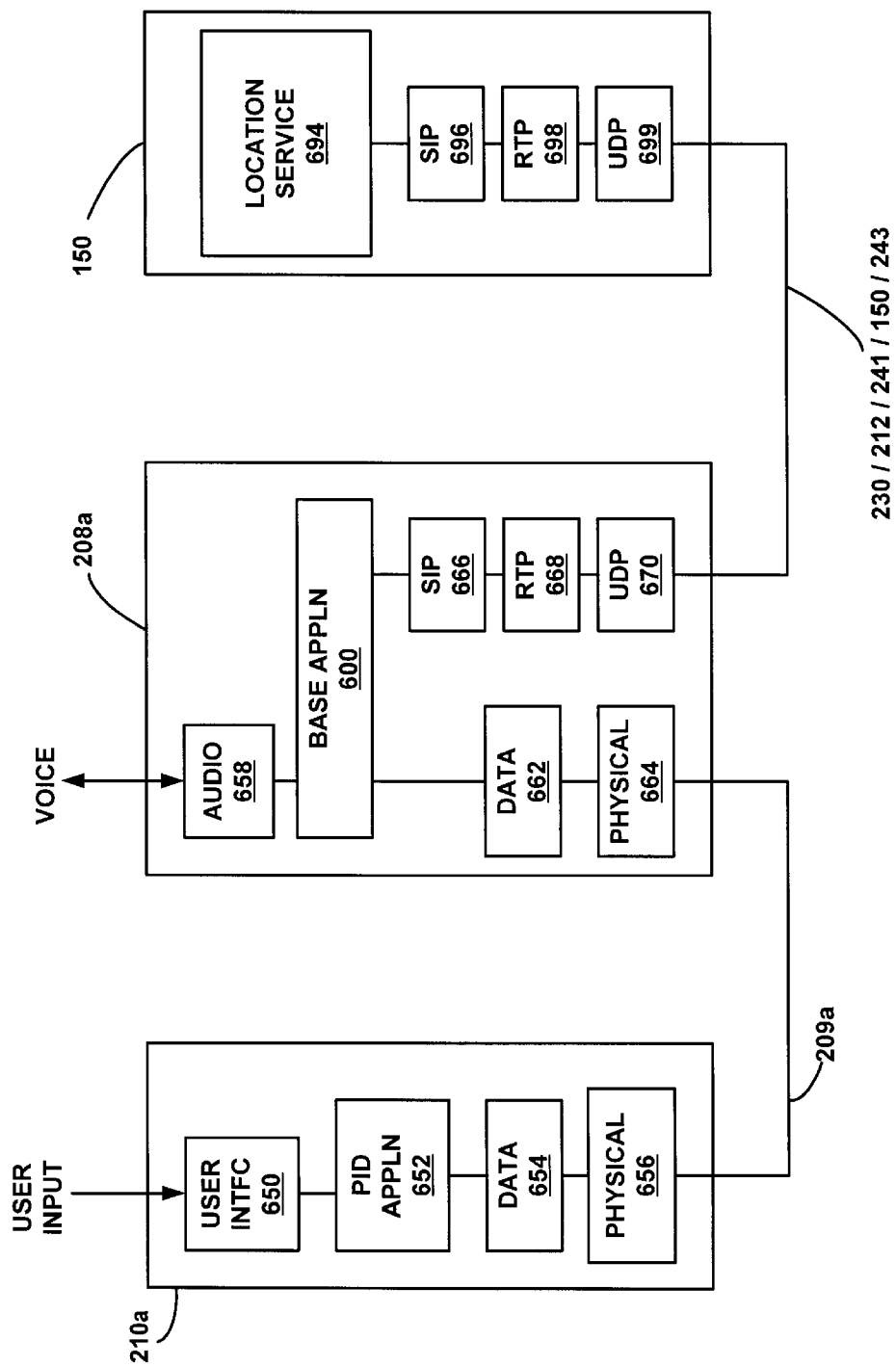
FIG. 6 is a block and stack layer diagram illustrating an embodiment of the protocol stacks in an exemplary embodiment of a PID linked to a data network telephone.

FIG. 6 is a functional block diagram and protocol stack diagram illustrating an embodiment of the protocol stacks in the first PID 210a and the first data network telephone 208a that support link 209a. In the infrared RS-232 embodiment, the link interface circuitry 545 in the first PID 210a provides the physical layer 656, such as that specified by the Infrared Data Association (IrDA), that connects via link 209a to the link interface circuitry 260 implementing a physical layer 664 in the first data network telephone 208a. The data link layer 654 in the first PID 210a provides data link control for link 209a in transferring data to and from a PID application client 652. Similarly, the first data network telephone 208a includes a data link layer 662 and a base application server 600 that is configured to synchronize connection and other functions with the PID application 652 in the first PID 210a.

When PID 210a is activated, either through power-up or through a user input at the user interface 650, the synchronization application client 652 in the PID 210a may send the user's SIP URL across the link 209a to the first data network telephone 208a, where it is received by the synchronization application server 600. The synchronization application server 600 sends the SIP URL received from the PID 210a across connection 230 and the Ethernet LAN 212 through connection 243 to the network telephony connection server 150. The network telephony connection server 150 may store the SIP URL and the IP address of the associated data network telephone 208a in the SIP database 152 so that the SIP URL is listed as being resident at the IP address of the data network telephone 208a. (If the network telephony connection server 150 uses a location server for registration/location tasks, the registration information might instead be stored with such a location server). SQL (Structured Query Language) is preferred for implementing and maintaining the database. Once the PID 210a is registered with the network telephony connection server 150, calls to the SIP URL for PID 210a (or the user of the PID 210a) will be directed to the data network telephone 208a.

Figure 7:
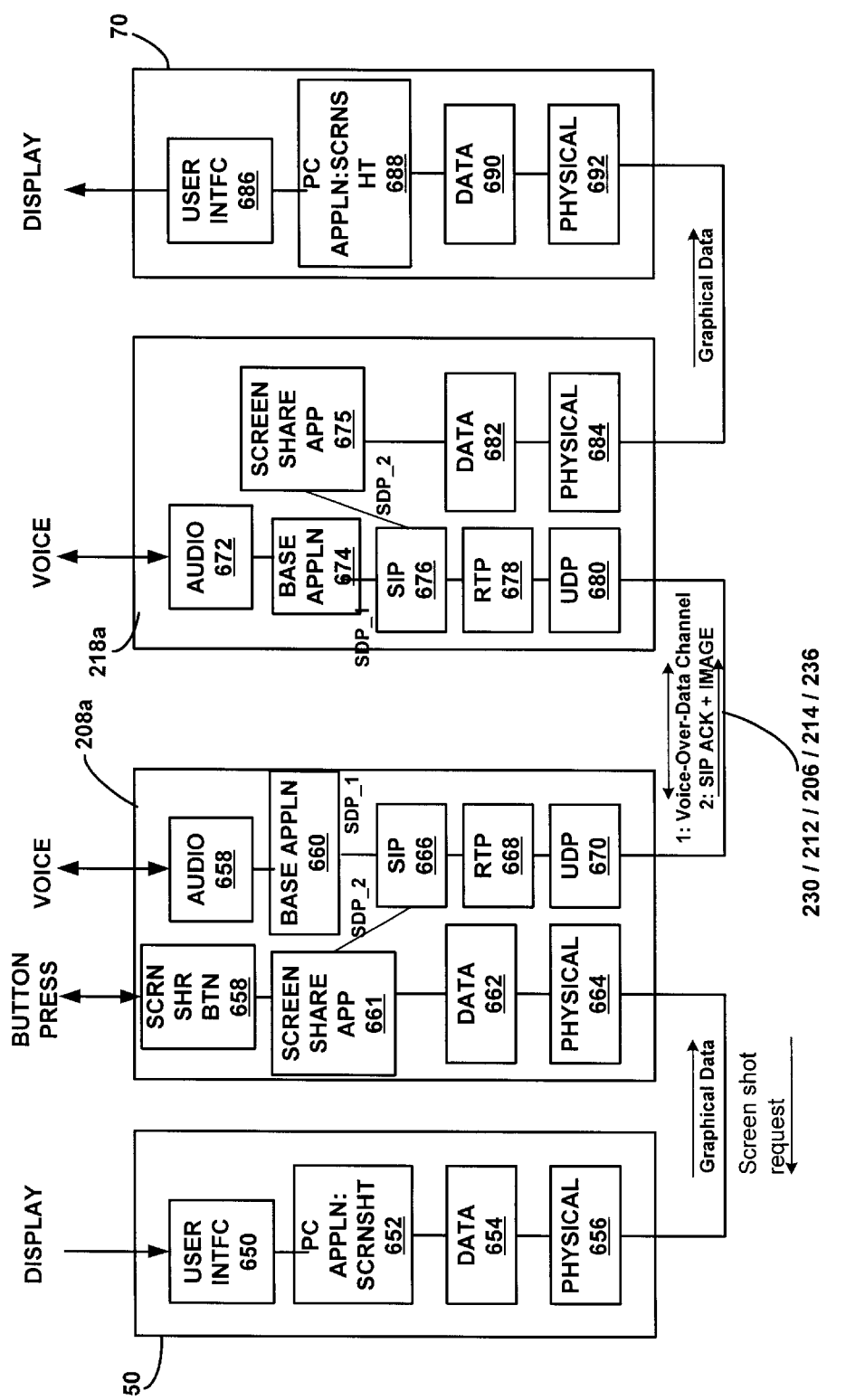
FIG. 7 is a block and stack layer diagram illustrating an embodiment of the present invention in which a SIP call may be established.

FIG. 7 is a functional block and protocol stack diagram illustrating an embodiment of the present invention where a SIP connection is established from the first data network phone 208a to the second data network phone 218a through network connection 230, first access network 212, data network 206, second access network 214 and network connection 236. The routers 228 and 238, and associated connections 232a–b and 234a–b, are not shown to simplify the block diagram representation.

The diagram of FIG. 7shows how the SIP connection is used to provide screen image sharing services between the first computer 50 and the second computer 70 in one aspect of the present invention. The PC screen shot application 652 in computer 50 is configured to retrieve graphical data on the display user interface 650 in response to a request from the data network telephone 208a. The PC screen shot application 652 sends the graphical data back to the first data network telephone 208a.

The first data network telephone 208a includes a screen share button 658 which sends a button press indication to the screen share application 661. The screen share application 661 sends the screen shot request to the computer 50.

The base application 660 is configured to define voice over data channels for transport to the second data network telephone 218*a*. The base application 660 defines the voice over data channels with the first session description protocol SDP__1. In response to the SDP__1, the voice over data channel is formed between the first and second data network telephones 208*a,b*.

When the screen shot image is received at the first data network telephone 208*a*, the screen share application 661 uses a screen shot session description protocol SDP__2 to signal the SIP stack 666 to send a SIP Invite to the second data network telephone 208*b*.

Multiple data channels in SIP may be defined through the Session Description Protocol described in RFC 2327, herein incorporated by reference. Included in a SIP INVITE request for a connection are options for the requested connection that describe the number and type of media streams. Each media stream is described by a "m=" line in the INVITE request. For example, a request for a connection that includes an audio stream and a bidirectional video stream using H.261 might look like this:

TABLE 1

```
v=0
o=alice 2890844526 2890844526 IN IP4 host.anywhere.com
c=IN IP4 host.anywhere.com
m=audio 49170 RTP/AVP 0
a=rtpmap:0 PCMU/8000
m=video 51372 RTP/AVP 31
a=rtpmap:31 H261/90000
```

If the called device includes functionality to receive the connection as described in Table 1, then the called device will respond to the INVITE request with a 200 OK response that includes the same option values. If the called device or party is unable or unwilling to receive such a connection, then it will respond with alternative option values for the connection. See RFC 2543 for further details regarding the negotiation of connection parameters in SIP.

In FIG. 7, a first data channel for voice data has been negotiated between the first and second data network telephones 208*a,b*. A separate SIP message exchange may also be carried out simultaneously to communicate screen contents from one computer 50 to another computer 70. The SIP stack 676 in the second data network telephone 208*b* determines from the session description protocol whether to use the base application 674 (for SDP__1) or the screen share application 675 (for SDP__2). If SDP__2 is used, the screen share application 675 receives the graphical image from the SIP stack. The SIP stack receives the graphical data in the SIP ACK message. The screen share application 675 communicates the graphical data to the second computer 70. The PC application screens shot 688 in the second computer receives the graphical data for display on the computer screen.

In an alternative embodiment, the a data channel may be established between the first and second data network telephones to communicate the graphical images from the screen shot. The transfer of graphical images using the signaling protocol is preferred however, because it is simpler and uses only the resources necessary for the transfer of the images.

While the invention has been described in conjunction with presently preferred embodiments of the invention, persons of skill in the art will appreciate that variations may be made without departure from the scope and spirit of the invention. For example, the access networks shown in FIG. 2 may comprise any other suitable type of local area network or service infrastructure.

In addition, protocols of various types are referenced throughout. While preferred and alternative embodiments may implement selected protocols, any suitable replacement protocol not mentioned, or any function not part of a protocol used to replace a corresponding function from a protocol may be implemented without departing from the scope of the invention.

This true scope and spirit is defined by the appended claims, interpreted in light of the foregoing.

We claim:

1. A system for communicating shared computer screens on a data network telephony system comprising:

a data network to provide data connectivity for a plurality of data communications channels using data transport protocols;

first and second data network telephones connected to the data network, each data network telephone operable to communicate a voice signal as voice-over-data packets on a voice-over-data channel, the voice over data channel being one of the plurality of data communications channels on the data network, the data network telephones operable to convert voice-over-data packets communicated on the voice-over-data channel to voice signals;

a screen share button and a screen share application in the first data network telephone, the screen share button operable to indicate a button press to the screen share application, the screen share application operable to send a screen share request on the data network, to receive a screen shot image from the data network and to send the screen shot image to the second data network telephone;

a first computer connected to the first data network telephone, the first computer comprising a computer screen share application operable to receive the screen share request, to retrieve a screen shot image, and to communicate the screen shot image on the data network; and a second computer connected to the second data network telephone, the second computer operable to receive the screen shot image from the second data network telephone.

\* \* \* \* \*